Dec. 8, 1931.　　　J. E. ESHBAUGH　　　1,835,561
GEARLESS PRESSURE GAUGE
Filed Aug. 18, 1928

Inventor
Jesse E. Eshbaugh
By Blackmore, Spencer & Flick
Attorneys

Patented Dec. 8, 1931

1,835,561

UNITED STATES PATENT OFFICE

JESSE E. ESHBAUGH, OF FLINT, MICHIGAN, ASSIGNOR TO A C SPARK PLUG COMPANY, OF FLINT, MICHIGAN, A COMPANY OF MICHIGAN

GEARLESS PRESSURE GAUGE

Application filed August 18, 1928. Serial No. 300,493.

This invention relates to pressure gauges of the Bourdon tube type.

Prior gauges of this type in which a single tube has been used have invariably mounted the tube at one end and connected the pointer swinging mechanism with the free end. This pointer swinging mechanism has usually been mounted on a frame secured to a back plate or has been supported on the socket in which the Bourdon tube is mounted. It is also old to mount two Bourdon tubes at their ends in the same socket and allow the free ends of the two tubes to expand and communicate their motion to a suitable pointer swinging mechanism which has likewise been mounted on a frame or on the Bourdon tube socket.

It is the object of the present invention to use a single Bourdon tube mounted at its center to the usual socket or stud and have a pointer swinging mechanism mounted at the free ends of the tube free from any connection with the frame or socket. This construction reduces the number of parts and the cost considerably and makes a very simplified structure.

The object of the invention is accomplished by mounting a Bourdon tube to the usual socket which is secured in a conventional frame. The tube is mounted at substantially its center leaving the ends free. At one end there is secured by means of an integral tongue a supporting frame on which a pointer frame, including a pointer and counterweight, is pivotally mounted. The other end of the tube has secured thereto, a contact frame which includes a calibrating loop. The end of the contact frame touches a wing bent from the pointer frame.

Referring to the drawings.

Figure 1:
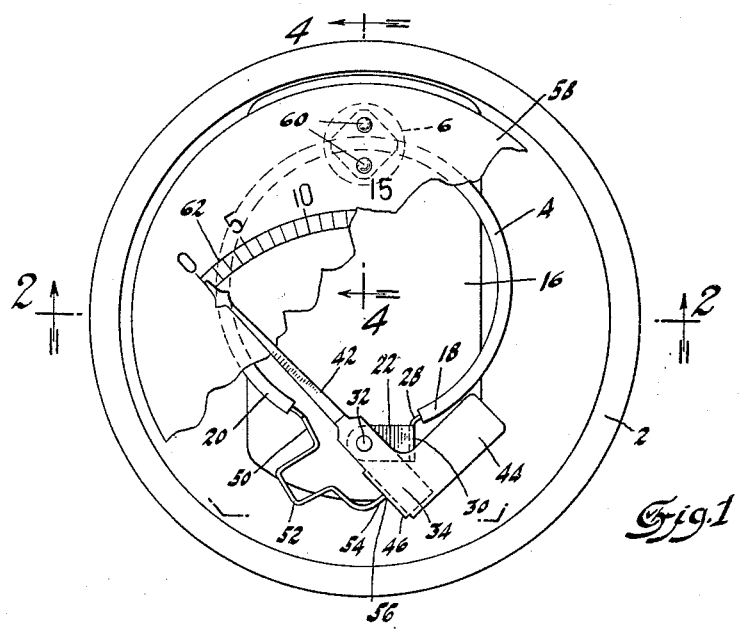
Fig. 1 is a face view of the gauge with the dial partly removed to better illustrate the working parts.
Figure 2:
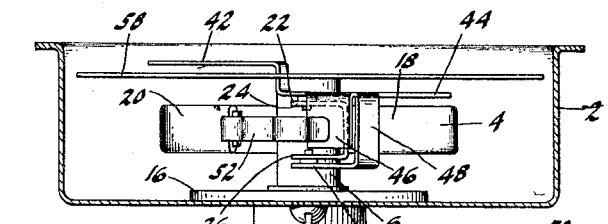
Fig. 2 is a view on the line 2—2 of Fig. 1.
Figure 4:
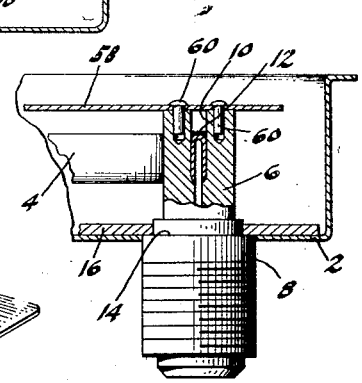
Fig. 4 is a section on the line 4—4 of Fig. 1.
Figure 3:
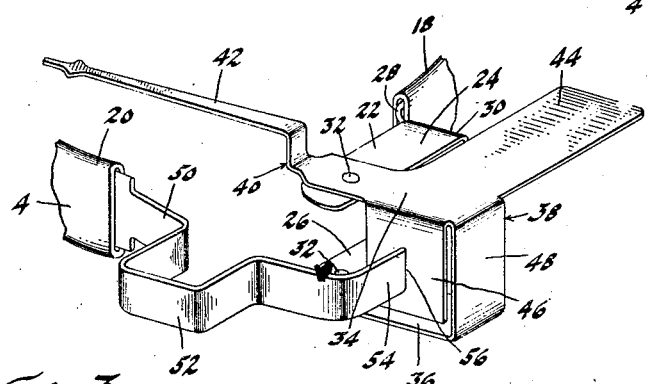
Fig. 3 is a perspective view of the pointer swinging mechanism mounted at the ends of the Bourdon tube.

Referring to the drawings, the numeral 2 indicates the case of the gauge. Inside the case 2 there is mounted the Bourdon tube 4, secured in a reduced end 6 of the stud or socket 8. The reduced end 6 is provided with a slot 10 in which the tube 4 is secured by soldering as at 12. Secured to the socket 8 at a shoulder 14 is a frame 16 which rests in the bottom of the case 2. If desired, the frame may be omitted and the socket secured directly to the case.

By referring to Fig. 1, it will be noted that the Bourdon tube 4 is secured to the socket 8 at substantially its mid-point, leaving the ends 18 and 20 free. By mounting the tube at its mid-point advantage is obtained of the expansion of the two free ends of the tube in opposite directions giving a greater swing of the pointer for the same expansion of the tube.

Secured to the end 18 of the tube is the supporting frame 22 comprising the U-shaped portion having the legs 24 and 26 and the arm 28 by means of which it is fastened to the tube end. The arm 28 is bent from the base portion 30 of the U-shaped portion of the frame. The ends of both legs are provided with openings, the purpose of which will now be described.

Mounted in the openings in the ends of the legs 24 and 26 are the bearing pins 32 rigidly secured to the legs 34 and 36 of the U-shaped portion 38 of a pointer frame 40. The pointer frame includes the pointer 42, the counterweight 44 and the contact wing or plate 46, all of which are formed integral. The contact plate 46 is bent into parallelism with one edge of the U-shaped portion 38 and is preferably formed integral with the leg 34, although if desired it may be formed as a continuation of the base 48 of the U-shaped portion 38.

The opposite end 20 of the tube 4 has secured thereto, the contact frame 50, having the calibrating loop portion 52 and the bent end or finger 54 which contacts with but is not secured to the plate 46 as at 56.

The function of the loop 52 is to calibrate the gauge. By pinching the loop together or springing it apart the point at which the end 54 contacts with the wing 46 may be changed and in this way determine the initial position of the pointer 42.

A suitable dial 58 is secured to the end of the reduced portion 6 of the stud 8 by means of the pins or rivets 60. The dial is provided with a scale 62 and a suitable slot to allow the pointer 42 to extend over the top of the dial.

The operation of the device is as follows: By referring to Fig. 1, it will be seen that the counterweight 44 constantly tends to urge the pointer 42 in a clockwise direction but the pointer is held from moving by the finger 54 contacting with the wing 46. When the tube 4 is under pressure, the ends 18 and 20 will expand in opposite directions. The end 18 will now cause the frame 22 to move bodily in a counter-clockwise direction and will pull the pointer therewith and cause it to move a definite amount over the scale 62. At the same time the opposite end 20 of the tube 4 will move the end 54 of the frame 50 in a clockwise direction away from the wing 46 and allow the counterweight 44 to further swing the pointer 42 over the dial. As the tubes contract, the motions of the frames 22 and 50 will be in a reverse direction and will cause the pointer 42 to swing counter-clockwise.

A reverse reading of the mechanism of the gauge may be had by inverting the Bourdon tube with its attached frames before it is mounted in the slot 10. By now mounting a suitably and similarly formed pointer frame and pointer in the openings in the end of the frame 22, the pointer will swing in a counter-clockwise direction.

From the construction as described, it will be apparent that the mechanism for swinging the pointer is mounted entirely at the free ends of the Bourdon tube and is independent of any support from the back plate or socket.

By mounting the Bourdon tube at its center and allowing the free ends to swing the pointer, it is possible to use a smaller Bourdon tube and give to the tube a longer life and greater and more permanent accuracy because of the reduced strain in the tube.

If desired, the Bourbon tube may be secured in the socket somewhat farther toward one end. This is done in case it is desired to give a greater amount of flexure or swing to one end of the tube than to he other.

Instead of the contact line between the end 54 and the wing 46, it is within the scope of the invention to use an additional link which is pivoted to both the end 54 and the plate 46 or to any other suitable portion of the pointer frame 40.

I claim:

1. In a gauge, a Bourdon tube mounted at its middle portion, a supporting frame mounted at one tube end, a pointer frame pivotally mounted on said first named frame, and a contact frame on the other end of the tube, said contact frame contacting with said pointer frame but having no pivotal connection therewith.

2. In a gauge, a pointer and counter-weight formed of a single piece, the counter-weighted end including a U-shaped frame portion to pivotally mount the pointer and a wing portion bent from the U-portion and forming the counter-weight.

3. In a gauge, a Bourdon tube mounted at its middle portion, a supporting frame mounted at one tube end, a pointer frame pivotally mounted on said first named frame, a contact frame on the other end of the tube, said contact frame contacting with said pointer frame but having no pivotal connection therewith, and a wing integral with said pointer frame comprising the place of contact of said pointer and contact frames.

4. In a gauge, a Bourdon tube mounted at its middle portion, a supporting frame mounted at one tube end, a pointer frame pivotally mounted on said first named frame, a contact frame including a calibrating loop on the other end of the tube, said contact frame contacting with said pointer frame but having no pivotal connection therewith.

5. In a gauge, a Bourdon tube mounted at its middle portion, a U-shaped supporting frame mounted at one tube end by an integral arm extending from the base of the U, a pointer frame pivotally mounted on said first named frame on the legs of the U, a contact frame on the other end of the tube, said contact frame contacting with said pointer frame but having no pivotal connection therewith.

6. In a gauge having a dial, a Bourdon tube mounted at its middle portion, a supporting frame mounted at one tube end, a pointer frame pivotally mounted on said first named frame, a contact frame on the other end of the tube, said contact frame contacting with said pointer frame, and a counter-weight on said pointer frame to cause the pointer to swing across the dial when the tube ends expand.

7. In a gauge, a Bourdon tube mounted at its middle portion, a supporting frame including a U-shaped portion mounted at one tube end, a pointer frame including a U-shaped portion, said U-shaped portions being pivotally interconnected, and a contact frame on the other end of the tube, said contact frame contacting with said pointer frame.

8. In a gauge, a Bourdon tube mounted at its middle portion, a supporting frame mounted at one tube end, a pointer frame pivotally mounted on said first named frame, a contact frame on the other end of the tube, said contact frame contacting with said pointer frame but having no pivotal connection therewith, said first named frame and said pointer frame comprising U-shaped portions pivoted together at the ends of the legs of the U's.

In testimony whereof I affix my signature.

JESSE E. ESHBAUGH.